United States Patent [19]

Hamlin et al.

[11] Patent Number: 4,459,013

[45] Date of Patent: Jul. 10, 1984

[54] DUPLEX/SIMPLEX PRECOLLATION COPYING SYSTEM

[75] Inventors: Thomas J. Hamlin; Clifford L. George, both of Macedon, N.Y.

[73] Assignee: Xerox Corporation, Stamford, Conn.

[21] Appl. No.: 825,743

[22] Filed: Aug. 18, 1977

[51] Int. Cl.$^3$ .................. B65H 3/04; B65H 5/26
[52] U.S. Cl. ..................... 355/23; 271/3.1;
  271/6; 271/65; 271/186; 271/196; 271/276;
  355/35 H
[58] Field of Search .............. 271/3.1, 3, 4, 5, 6,
  271/7, 65, 186, 64, 9, 196, 276; 355/23, 26, 3 R,
  14, 35 H

[56] References Cited

U.S. PATENT DOCUMENTS

| | | | |
|---|---|---|---|
| Re. 27,976 | 4/1974 | Sahley | 355/64 |
| T957,006 | 4/1977 | Reid et al. | 271/3.1 |
| 2,649,302 | 8/1953 | Johnson et al. | 271/65 |
| 2,822,172 | 2/1953 | Mayo et al. | |
| 3,008,707 | 11/1961 | McGarvey | 271/303 |
| 3,227,444 | 1/1966 | Egan | 271/65 |
| 3,408,140 | 10/1968 | Hemphill | 355/23 |
| 3,409,366 | 11/1968 | Hanson et al. | 355/102 |
| 3,466,029 | 9/1969 | Jensen et al. | 271/276 |
| 3,476,382 | 11/1969 | Tregay et al. | 271/240 |
| 3,484,164 | 12/1969 | Byland | 355/14 R |
| 3,506,347 | 4/1970 | Carlson | 355/3 |
| 3,536,320 | 10/1970 | Derby | |
| 3,547,535 | 12/1970 | McLean et al. | 271/276 X |
| 3,552,739 | 1/1971 | Roberts et al. | 271/4 |
| 3,556,511 | 1/1971 | Howard et al. | 271/4 |
| 3,615,129 | 10/1971 | Drawe et al. | 355/3 |
| 3,630,515 | 12/1971 | Knapp | 271/4 |
| 3,630,607 | 12/1971 | Korn | 355/6 |
| 3,645,615 | 2/1972 | Spear | 355/3 |
| 3,663,012 | 5/1972 | Van Den Honer | 271/276 |
| 3,768,803 | 10/1973 | Stange | 271/34 |
| 3,770,348 | 11/1973 | Martin | 271/301 |
| 3,844,654 | 10/1974 | Guenther | 355/24 |
| 3,862,802 | 1/1975 | Till | 355/23 |
| 3,888,579 | 6/1975 | Rodek et al. | 355/14 |
| 3,900,192 | 8/1975 | Gibson | 271/3.1 |
| 3,937,454 | 2/1976 | Colwill | 271/6 |
| 3,942,785 | 3/1976 | Stange | 271/65 |
| 3,963,339 | 6/1976 | Taylor et al. | 271/9 |
| 3,963,345 | 6/1976 | Stemmle et al. | 355/50 |
| 3,980,406 | 9/1976 | Lang | 355/24 |
| 4,040,616 | 8/1977 | Clarkson et al. | 271/65 |
| 4,043,550 | 8/1977 | Phillips et al. | 271/233 |
| 4,062,061 | 12/1977 | Batchelor et al. | 364/900 |
| 4,078,786 | 3/1978 | Stange | 271/3 |
| 4,089,515 | 5/1978 | Stange et al. | 271/3 |
| 4,099,150 | 7/1978 | Connin | 355/3 R |
| 4,099,254 | 7/1978 | Andrews et al. | 364/900 |
| 4,109,903 | 8/1978 | Stange et al. | 271/3 |
| 4,116,558 | 9/1978 | Adamek et al. | 355/24 |
| 4,140,387 | 2/1979 | Gustafson | 355/14 |
| 4,146,219 | 3/1979 | Phillips | 271/233 |
| 4,158,500 | 6/1979 | DiFrancesco et al. | 355/14 |
| 4,169,674 | 10/1979 | Russel | 355/14 |

FOREIGN PATENT DOCUMENTS 1494236 12/1977 United Kingdom .

OTHER PUBLICATIONS

Rogers, J. C. et al., "Document Feed", *IBM Technical Disclosure Bulletin*, vol. 14, No. 5, Oct. 1971, p. 1547.

Bullock, M. K., "Duplex Document Feeder", *IBM Technical Disclosure Bulletin*, vol. 19, No. 12, May 1977, p. 4496.

Rept. No. 14607, "Automatic Control . . . ", *Research Disclosure*, Ind. Opp. Ltd. Havant, Hampshire, U.K., No. 146, Jun. 1976, pp. 19-22.

Rept. No. 15671, "Apparatus for Producing Collated Copies . . . ", *Research Disclosure*, Ind. Opp. Ltd., Havant, Hampshire, U.K., No. 156, Apr. 1977, pp. 80-82.

Rept. No. 15766, "Producing Collated Copies . . . ", *Research Disclosure*, Ind. Opp. Ltd., Havant, Hampshire, U.K., No. 157, May 1977 pp. 77-79.

Rept. No. 16332, "Collating Document Feeder . . . ", *Research Disclosure*, Ind. Opp. Ltd., Havant, Hampshire, U.K., Nov. 1977, pp. 49-52.

Report No. 14,927, "Apparatus for Producing Duplex Collated Copies", *Research Disclosure*, Industrial Opportunities, Ltd., Havant, Hampshire, U.K., No. 149, Sep. 1976, pp. 18-20.

*Primary Examiner*—Bruce H. Stoner, Jr.
*Assistant Examiner*—James E. Barlow

[57] ABSTRACT

A copying system for copying either duplex or simplex original document sets as pre-collated copy sets, utilizing a document handling system providing selective automatic recirculative pre-collation copying of either duplex or simplex document sheets, with selective automatic sheet inversion. Also described is an integral sheet stack normal force/jogger unit for continuous and simultaneous top loading and bottom feeding from either opposite or common directions from a stack of document or copy sheets.

39 Claims, 4 Drawing Figures

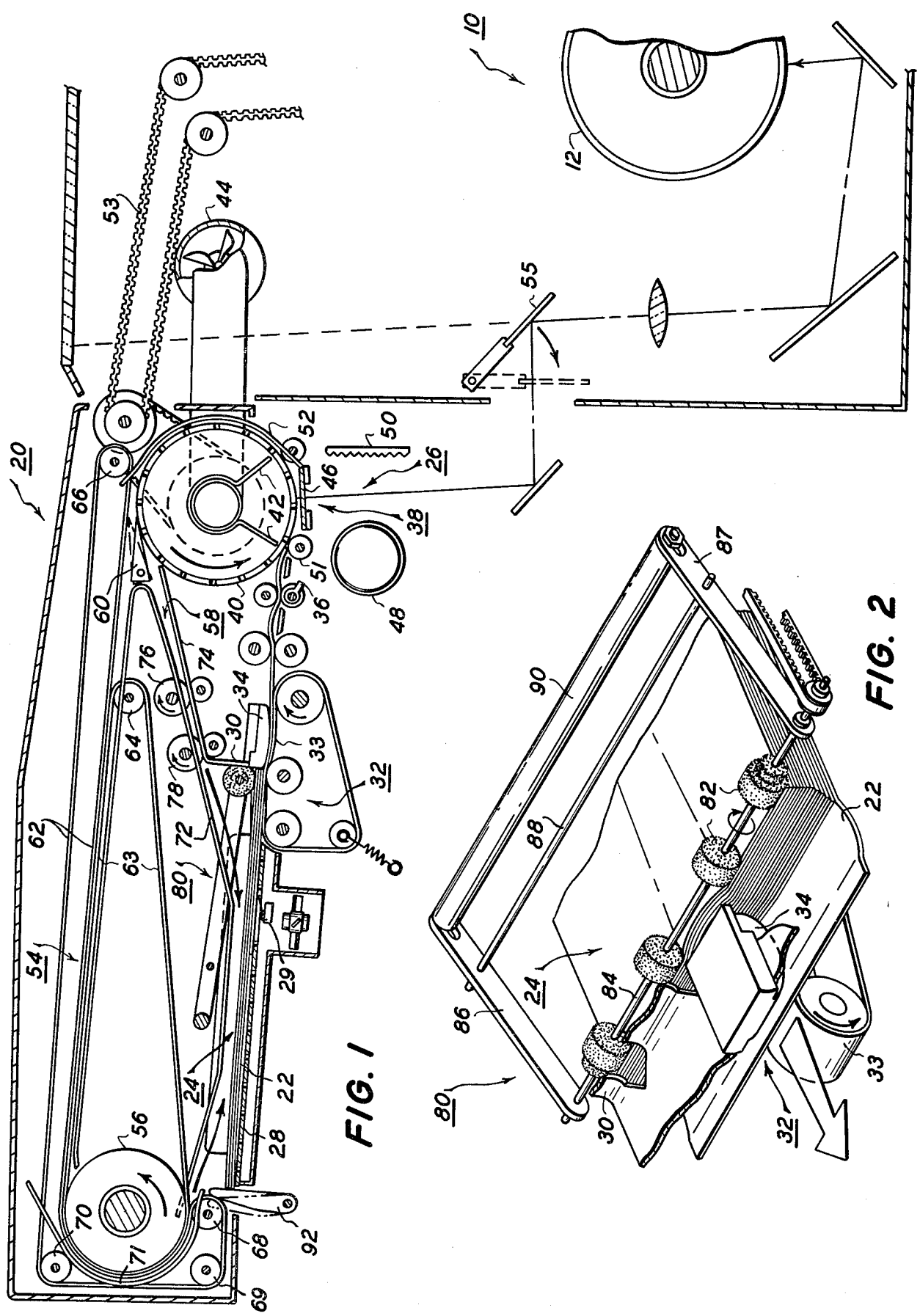

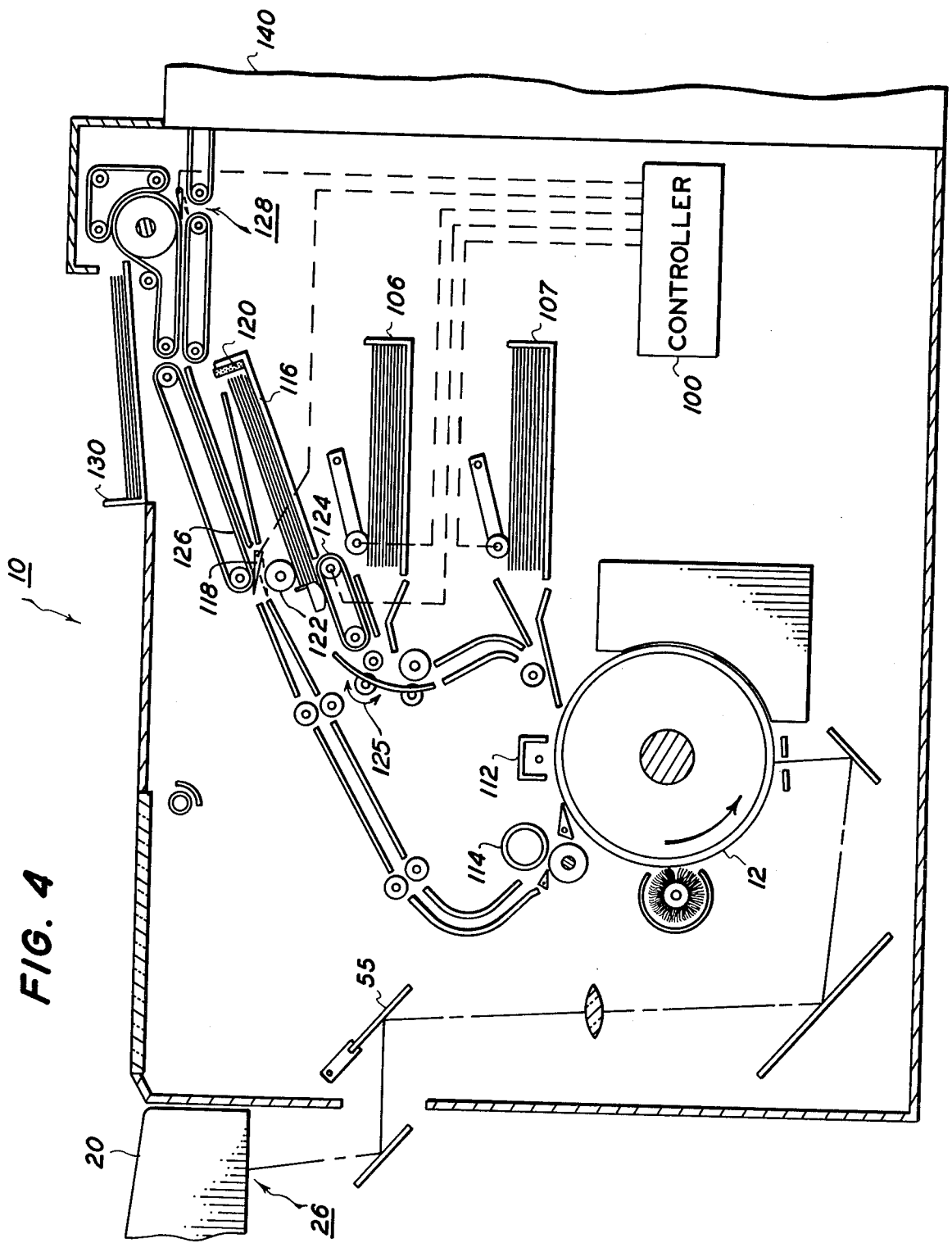

DUPLEX/SIMPLEX PRECOLLATION COPYING SYSTEM

SUMMARY AND BACKGROUND OF THE INVENTION AND CITATION OF ART

The present invention relates to improved pre-collation copying systems and to improved automatic document handling systems therefor providing pre-collation copying from duplex documents.

As xerographic and other copiers increase in speed, and become more automatic, it is increasingly important to provide higher speed yet more reliable and more automatic handling of both the copy sheets and the individual original documents being copied. Yet, it is desired to accommmodate original documents and copy sheets which vary widely in size, weight, thickness, material, condition, humidity, age, etc. It is desirable to automatically handle such individual document and copy sheets in rapid succession with relatively compact and inexpensive sheet handling apparatus. Further, it is desirable to provide sheet handling systems and apparatus which accommodates different sheet orientations and movement directions so as to be able to optimize and compact the design of the copier and/or its document handling unit. The providing of duplex copying capabilities and/or a pre-collation copy system greatly complicates and increases these copier sheet handling difficulties.

The term "duplex copying" may be more specifically defined into several different, individually known, copying modes. In duplex/duplex copying, both sides of a duplex document sheet (which has images on both sides) are copied onto both sides of a single copy sheet. In duplex/simplex copying, both sides of a duplex document are copied onto only one side of two successive copy sheets. In simplex/duplex copying, the images on one side of two successive simplex documents are placed on opposite sides of a single copy sheet. In the printing industry, as opposed to the copier industry, two-sided copying may be referred to as "backing-up" rather than duplex copying.

In a set of duplex documents or copy sheets, pages 1, 3, 5, etc., will typically appear on one side, with pages 2, 4, 6, etc., on the other side. Thus, they may be respectively referred to as the "odd order" and "even order" sides.

The duplex copying of the copy sheets for duplex/duplex or simplex/duplex copying may be done by first making a set of simplexed copy sheets (printed only on their first sides) temporarily storing those simplex copy sheets in a tray, and then feeding them back through the copying processor for a second pass printing of the opposite order document images on the opposite sides of the copy sheets. Such systems may be referred to as sequential or dual pass duplexing systems. Examples of such systems for handling the copy sheets being duplexed are shown in U.S. Pat. Nos. 3,615,129, issued Oct. 26, 1971, to W. A. Drawe, et al., and 3,645,615, issued Feb. 29, 1972, to M. R. Spear, Jr., and in the Xerox 4000 and 4500 Copiers. Of particular interest as disclosing the preferred simplex/duplex pre-collation copying system disclosed herein is a U.S. Pat. No. 4,166,558, issued Sept. 26, 1978, based on Application Ser. No. 767,012, filed Feb. 9, 1977, by J. A. Adamek et al.. Column 7, first paragraph, thereof discusses duplex/duplex copying. These dual pass duplex systems have the advantage of being able to utilize a single, conventional, imaging station, transfer station, and processor for both sides of the copies.

Alternatively, a single pass or simultaneous duplex system may be used in which unfused images are transferred to both sides of the copy sheet in a single pass, simultaneously or in immediate sequence, and the first and second sides of each document are copied simultaneously or in immediate sequence (serially). An example of such a single pass duplex system is disclosed, for example, in U.S. Pat. No. 3,844,654 issued Oct. 29, 1975 to J. Guenther and the art cited therein. However, such systems typically disadvantageously require two separate imaging, image development, and transfer systems.

The present invention is particularly directed to pre-collation duplex copying systems in which the image sources are a set of original duplex document sheets, with images on both sides thereof, in which these duplex documents are automatically multiply recirculated with automatic exposure of both sides of the documents so as to provide pre-collated copy sets therefrom.

A highly desirable feature for a copier is to provide automatic document recirculation for pre-collation copying. As discussed, for example, in detail in U.S. Pat. No. 3,963,345 issued June 15, 1976, to D. J. Stemmle, et al., at Columns 1–4, such pre-collation copying systems provide a number of important advantages. The copies exit the copier in pre-collated sets, and do not require subsequent sorting in a sorter or collator. Any desired number of such copy sets may be made by making a corresponding number of recirculations of the document set in collated order past a copying station and copying each document once each time it recirculates. On-line finishing and/or removal of completed copy sets may be provided while additional copy sets are being made from the same document set.

However, a disadvantage of pre-collation copying systems is this fact that the documents must all be repeatedly circulated and repeatedly individually copied the number of times equivalent to the desired number of copy sets. Thus, for example, to make 10 copy sets of a 5 page simplex document set or book, one copy at a time would be made of each of the 5 document pages in this order: Pages 1, 2, 3, 4, 5; 1, 2, 3, 4, 5, etc.; repeated a total of 10 times (10 circulations) to make the desired 10 copy sets. [For bi-directional pre-collation copying this document copying sequence would, instead, be 1, 2, 3, 4, 5; 5, 4, 3, 2, 1; 1, 2, 3, 4, 5; etc.] Thus, it may be seen that increased document handling is necessitated for a pre-collation copying system, as compared to a conventional post-collation copying system in which all the desired copies are made at one time from each document page and collated subsequently. In such a post-collation copying system, the document set need only be circulated once to fill the bins of the copy sheet sorter or collator with the number of copy sets desired (limited in number, however, by the number of available bins).

The increased document handling required for a pre-collation copying system increases the likelihood of document damage or wear, and particularly aggravates the problems of document separation where the individual documents must be separated from the remainder of the documents in the document set for each recirculation thereof. Thus, it is highly desirable to have a simple and reliable document handling system and recirculation path for the document in all modes of operation.

The present invention is intended to overcome or minimize the above-discussed problems and disadvantages and provide the advantages of pre-collation copying. It provides a simple, compact, automatic pre-collation document handling system, in which the document set may be maintained in a compact manner, and recirculated in a short and simple document handling path, to minimize document damage and to maximize the ability to reliably multiply circulate and copy different or defective documents. The system disclosed herein is particularly suitable for, and compatible with, conventional copier platens and optics systems. It is also suitable for use as a removable or auxilary document handling system, removably overlying an existing or conventional copier platen to selectively allow use of that same platen and its associated optics for manual or other non-pre-collation copying. However, it is not limited thereto.

The method and apparatus disclosed herein is believed to be the first practical system detailed for the automatic selective pre-collation copying of either duplex or simplex document sheets onto pre-collated duplexed copy sheet sets utilizing conventional single imaging, development and transfer copier stations. There is disclosed herein a system whereby a copier may utilize the same automatic document recirculation and copy sheet handling systems to provide pre-collated copy sets in duplex/duplex, duplex/simplex, simplex/duplex, and simplex/simplex copying modes, thus providing all possible pre-collation copying modes from document sheets.

Some examples of art relating to pre-collation document handling systems in which a document is withdrawn from the bottom of a document set stack for copying, imaged at an imaging station, and then returned to the top of the stack, i.e. the original documents are multiply recirculated to and from the stack of documents, include: U.S. Pat. Re. 27,976, (originally U.S. Pat. No. 3,499,710, issued Mar. 10, 1970) to L. W. Sahley; U.S. Pat. No. 3,536,320, issued Oct. 27, 1970, to D. R. Derby; U.S. Pat. No. 3,552,739, issued Jan. 5, 1971, to R. R. Roberts, et al.; U.S. Pat. No. 3,556,511, issued Jan. 19, 1971, to A. Howard, et al.; U.S. Pat. No. 3,888,579, issued June 10, 1975 to V. Rodek et al.; and U.S. Pat. No. 3,937,454, issued Feb. 10, 1976, to R. H. Colwill. A recent precollation copying system of this type is shown in Belgium Pat. No. 835,568 laid open May 13, 1976, and West German patent application No. 2,550,985 published May 26, 1976, and French application Publication No. 2,291,131, laid open Nov. 12, 1976 now U.S. Pat. No. 4,169,674. A disclosure similar to the latter is in U.S. Defensive Publication T957,006 of Apr. 5, 1977, based on application Ser. No. 671,865, filed Mar. 30, 1976, by M. G. Reid, et al.. The systems shown in these latter cited applications also disclose other features of interest to the present application.

U.S. Pat. No. 2,822,172 issued Feb. 4, 1958 to C. R. Mayo et al. discloses a pre-collation copier with a vacuum drum holding and moving the documents for imaging.

It is known to multiple recyclingly copy the same side of a single individual document in a non-precollation copying system wherein the recycling path length may be changed to accommodate different sizes of documents, as shown in U.S. Pat. No. 3,409,366, issued Nov. 5, 1968, to W. J. Hanson, et al.. There a movable deflector finger in the document path selects between the two partially different document circulation paths.

The general concept of imaging a document while it is on a vacuum or frictional surface drum, which drum also serves to invert the document for subsequently copying the second side thereof, i.e., as part of a duplex document copying system, is disclosed, for example, in the above-cited U.S. Pat. No. 3,844,654, issued Oct. 29, 1974, to J. Guenther. Note there drum 44, described in column 4. Also noted in this regard are U.S. Pat. Nos. 3,227,444, issued Jan. 4, 1966, to J. F. Egan; and 3,506,347, issued Apr. 14, 1970, to C. F. Carlson (note FIG. 4).

Other examples of non-pre-collation copying systems with roller or other inverting systems in a document path for inverting duplex documents so that the opposite sides thereof may be imaged are shown in IBM Technical Disclosure Bulletins Vol. 14, No. 5, October 1971, p. 1547; and Vol. 19, No. 12, May 1977, p. 4496. Another is U.S. Pat. No. 3,862,802 issued Jan. 28, 1975, to H. R. Till.

Of particular interest, as disclosing a means for selectively inverting or not inverting a document in a copying path, for copying one side of a document on one pass and the other side of that document on the next pass, is the system shown particularly in FIG. 6 and described at Cols. 5–6 in U.S. Pat. No. 4,040,616, issued Aug. 9, 1977 and filed Jan. 14, 1976 by S. G. Clarkson et al..

An example of a copier control system and logic circuitry in which the systems disclosed herein may be incorporated is described in U.S. Pat. No. 3,936,182, issued Feb. 3, 1976, to Sikander Sheikh. While integral softward incorporation into the copier's general logic circuitry and software, as in that patent, of the functions and logic defined herein is preferred, the functions and systems disclosed herein may be conventionally incorporated into a copier utilizing any other suitable or known software or hard wired logic system or microprocessor or known cam-bank switch controllers for copiers. The control of the exemplarly systems disclosed herein may be accomplished by activating known electrical selonoid control sheet deflector fingers and drive motors or their clutches in the indicated sequences and does not require unconventional sheet handling hardware or controls. Conventional sheet path position and jam sensor switches may be utilized.

By way of background as to details of particular sheet handling apparatus disclosed herein, an example of a stacking tray with a bottom retard sheet feeder and a normal force applicator therefor is disclosed in U.S. Pat. No. 4,014,537, issued Mar. 29, 1977, to K. K. Stange. Bottom air flotation (which to a certain extent will affect the normal force requirements) is also disclosed there. The use of a foraminous impact or bounce pad for reversing the direction of motion of a sheet in a duplexing system is shown in U.S. Pat. No. 3,856,295, issued Dec. 24, 1974 to John H. Looney. In regard to the use of a continuously rotating jogging or stacking member to compile sheets in a stack against a registration edge there is noted by way of example a U.S. Pat. No. 3,709,595, issued Jan. 9, 1973, to L. H. Turner, et al..

All of the patents cited herein for art purposes are also incorporated by reference herein to the extent they provide teachings of usable or alternative systems or hardware for the disclosed embodiments herein.

Exemplary embodiments of the present invention are shown and described hereinbelow incorporated into an otherwise conventional exemplary xerographic apparatus and process. However, it is not limited thereto. The xerographic apparatus and process itself need not be described herein since various known patents, texts and commercial apparatus are available to provide further details thereof to those skilled in the art, including patents cited above. For example, the disclosed document handling system may be utilized with various copier optics and copy sheet handling systems and processing systems in addition to those disclosed herein.

BRIEF DESCRIPTION OF THE DRAWINGS

Further objects, features, and advantages of the present invention pertain to the particular apparatus and steps whereby the above-noted aspects of the invention are attained. Accordingly, the invention will be better understood by reference to the following description, and to the drawings forming a part thereof, which are approximately to scale, wherein:

FIG. 1 is a cross-sectional side view of an exemplary automatic duplex or simplex document handling system in accordance with the present invention;

FIG. 2 is a partial perspective view of the integral stack normal force applicator and sheet jogger unit of the document handling system of FIG. 1;

FIG. 4 is a cross-sectional, partly schematic, view of an exemplary copier with a simplex or duplex copy sheet handling system in accordance with the present invention, on which the document handling system of FIGS. 1 and 2 is mounted.

DETAILED DESCRIPTION OF THE PREFERRED EMBODIMENTS

Figure 3:
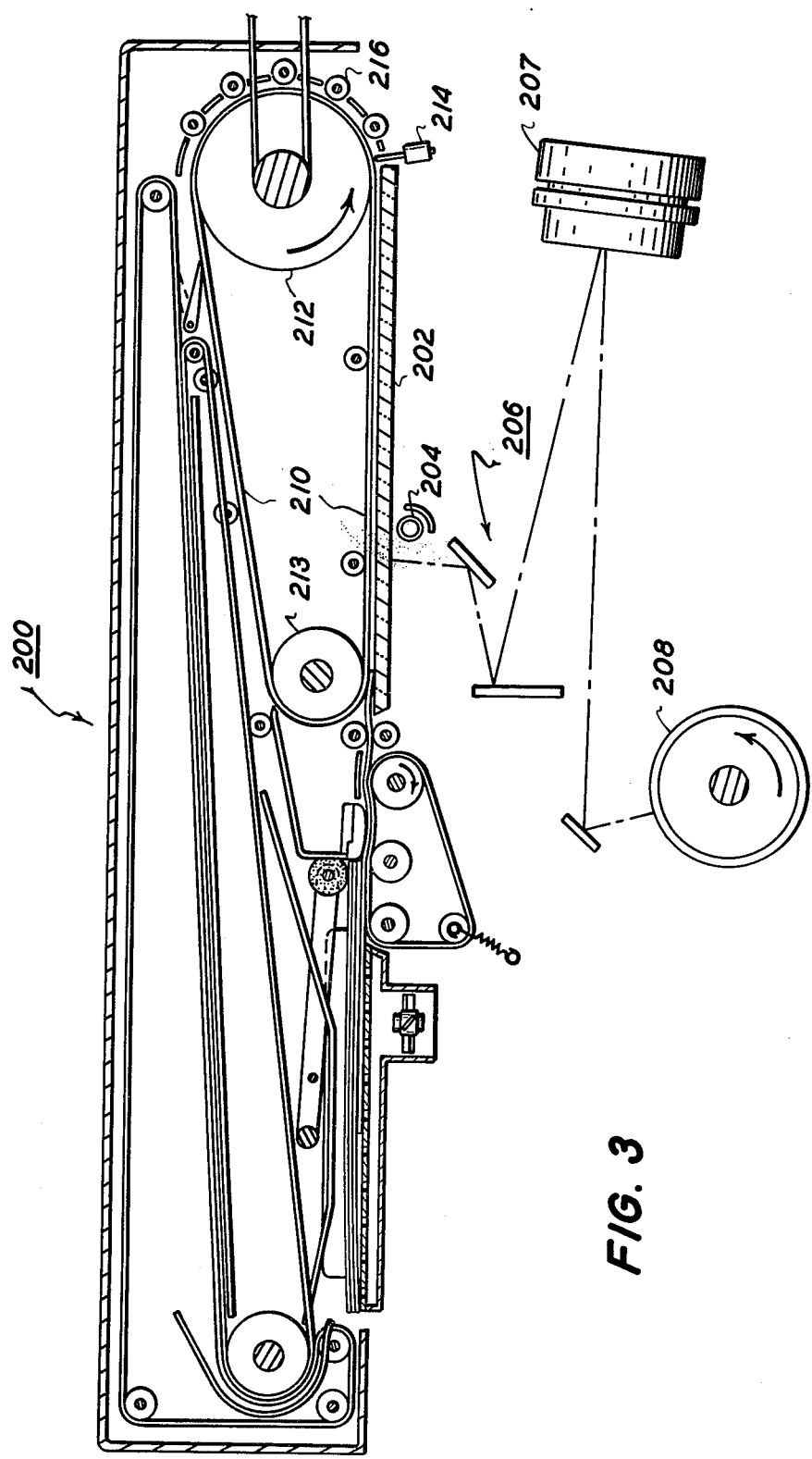
FIG. 3 is a view similar to FIG. 1 of an alternative embodiment of the document handling system of FIG. 1.

FIGS. 1, 2, and 4 illustrate one example of the present invention, and FIG. 3 shows an alternative example. However, it will be appreciated that the invention may have many other different orientations and structures, and different combinations with different exemplary xerographic or other copying systems and optics systems.

Referring first to FIG. 1, there is shown an exemplary simplex/duplex recirculating document handler (RDH) 20 mounted to a xerographic copier 10 for sequential pre-collation imaging of either simplex or duplex documents automatically onto the photoreceptor 12 of the copier 10. Any desired number of document set recirculations may be made automatically, thereby allowing any desired number of pre-collated copy sets to be copied therefrom. The RDH 20 multiply recirculates individual documents 22 from a set of documents in a document storage area 24 to an imaging station 26 and back. During each individual circulation of a set of documents, a recirculating document handling system moves the documents individually in a selected recirculating serial path from the document storage area 24 to and through a document imaging area for copying each document once, and then returns them to the same document storage area.

Describing the various sub-systems of the RDH 20 of FIG. 1 in the order in which a document is recirculated in its circulation path, the document storage area 24 here comprises a generally conventional sheet stack holder or tray 28 adapted to retain and align the stack of document sheets thereon. As also shown in FIG. 2, there is a sheet or stack aligning front stack stop 30 adjacent the front end of the tray 28.

An intermittently operable individual bottom sheet separator and feeder 32 is provided to feed individual sheets on demand from the bottom of the stack of sheets placed in the tray 28. The feeder 32 feeds out individual sheets in a single sheet feeding direction past the front stack stop 30 from the front end of the stack holder or tray 28. As shown, this bottom sheet feeding may be assisted by partial air flotation of the bottom of the stack by a blower and mainfold supplying air through apertures in the bottom of the tray 28. Examples of such a bottom sheet feeding and air flotation system are disclosed in U.S. Pat. No. 4,014,537, issued Mar. 29, 1977, to K. K. Stange, and the references cited therein. Also disclosed therein are normal force applicators pressing down on the top of the stack of sheets over the bottom feeder.

The exemplary bottom feeder 32 here similarly has a sheet feed belt 33 which extends under an apertured area of the tray 28 to engage the bottom surface of the bottom-most sheet therein and to pull sheets forward past the front stack stop 30 into a nip with a retard pad 34 which engages the upper surface of the sheets to provide sheet separation and allow only one sheet at a time to be fed from the tray 28.

In the RDH 20, the documents, whether simplex or duplex, may be loaded into the tray 28 face down in their normal collated (forward serial) order. That is, the original document sheets do not have to be manually rearranged in reverse order by the operator. Nor, in the case of duplex documents, do copies need to be made of the second sides and inter-mixed with the original documents to form a psudo-simplex document set. Furthermore, as will be further described herein, at the end of the copying run the documents are automatically restored to their collated condition in all cases so that they may be removed in collated order after copying from the tray 28. The RDH unit 20 is hinged to open along its duplex document path (described hereinbelow) to fully expose the tray 28 for loading and unloading a set of documents therein and for jam clearance.

After passing through the separating throat formed between the feed belt 33 and the retard pad 34, the lead edge of each individual document 22 here immediately enters a conventional registration system for aligning and registering for copying the front edge of the document. Here this comprises a registration gate 36 with stop fingers against which the lead edge of the sheet is buckled. The registration gate 36 is conventionally rotated out of the document path automatically at the appropriate time, controlled by the copier 10 condition, at which it is desired to feed the sheet downstream into the imaging station 26.

In the embodiment of FIG. 1, the imaging station 26, which is immediately downstream of the registration gate 36, is of the moving document slit scanning exposure type. That is, the document is moved past a narrow scanning aperture 38 at a constant velocity synchronized with the velocity of the photoreceptor 12. At the scanning slit 38 here, the document is uniformly held against, and driven by a vacuum cylinder 40. Only a bottom sector of the vacuum cylinder 40 is utilized for the imaging station 26. This may be accomplished, as shown here, by "V"-shaped manifold 42 inside the vacuum cylinder 40 which confines the applied vacuum to only that minor area of the cylinder 40 to insure that vacuum adhesion and driving of the document is occurring only in that area. The manifold 42 is shown here supplied with a vacuum from a conventional blower 44.

Just as the leading edge of the original document 22 enters the imaging station 26, at the beginning of the vacuum segment area of the vacuum cylinder 40, as shown, it is pressed against that vacuum segment of the vacuum roller by a feed roller 51. (This may, of course, be a series of spaced rollers on a common shaft). This roller 51 nips the document into positive engagement with the vacuum cylinder 40 at this region.

The scanning slit 38 here may additionally include, as shown, a transparent platen or window 46 through which the document is sequentially imaged as it is transported on the vacuum cylinder 40. The illumination of the document is by a conventional fluorescent or other illumination lamp 48 with a light emitting area facing the window 46. This illumination is increased, and document edge shadow effects reduced, by a thin vertical fresnel (multi-faceted) mirror 50 at the opposite side of the imaging station 26 from the lamp 48. The angles of the facets of the fresnel mirror 50 are individually differently aligned to all reflect light from the lamp 48 into the scanning slit 38. The image from the illuminated document passes between the lamp 48 and mirror 50, and through an appropriate mirror system, onto the photoreceptor 12. Here this includes a mirror 55 pivoted into the optical path of a Xerox Corporation "4000" or other copier so as to utilize the same lens and most of the other existing optical elements, which are shown, for example, in U.S. Pat. No. 3,775,008. However, the lens here is held stationary in this mode, and the mirror 55 blocks the normal image path from the copier platen. (With an over-platen RDH unit as in FIG. 3 or otherwise this would not be needed). When the mirror 55 is pivoted to its dashed position, conventional manual copying may be done on the copier platen. Variable magnification could be provided by repositioning the lens and mirror and changing the speed of the vacuum cylinder 40.

The vacuum cylinder 40 and its associated components here provide several functions. It provides the support and background for the document imaging, it provides the driving of the document synchronized to the photoreceptor speed, and it also provides a first document inversion system in the document recirculation path. As will be further explained herein, the recirculation path for simplex documents here is an endless uni-directional eccentric loop with two document turnarounds and inverters in the path, while the recirculation path for duplex documents has only one document turnaround and inverter here. The vacuum cylinder 40 and its associated components here comprise the first one of these two document turnarounds and inverters, and is a part of both the simplex and duplex paths.

To insure that the vacuum cylinder 40 is driven smoothly and precisely at the synchronized photoreceptor speed, to prevent image skipping or bluring, a separate belt 53 drive system directly from the photoreceptor drive is provided for the cylinder 40, independently of the drives of the registration system and the other document transports of the RDH 20. This prevents intermittent torque variations or vibrations from these other components from affecting the movement of the cylinder 40 and, therefore, the movement of the document being imaged. Further, the only positive engagement of the document in the imaging station 26 is at and by this vacuum sector.

The RDH vacuum imaging roller 40 drive belt 53 here is brought from the main copier drive shaft (low and centrally in the machine) up and over to the vacuum roller 40 in an L configuration. A cogged timing belt 53 is desirably used to prevent slip and maintain registration. However, an L belt configuration requires that the timing belt have at least one reverse or outside bend around one idler roller as well as a forward or inside bend around another, adjacent, idler roller at the corner of the L, as shown. One-sided timing belts (with cogs or teeth on the inside only) do not take reverse bends well. This problem is avoided by using a commercially available two-sided timing belt 53 with cogs on both sides.

The document is maintained in its desired path downstream from the imaging station 26 and turned over (inverted) by means of a paper guide 52 continuously spaced around the outside half of the cylinder 40. The guide 52 may contain idler rollers, but they do not nip the document against the roller 40 in this embodiment. Further, all of the downstream roller nips, including those in the registration gate 36, may be opened before the imaging of the document begins. Thus, no substantial upstream or downstream frictional drag forces are acting on the document as it passes through the imaging station, to insure that the document moves at precisely the same speed as the cylinder 40, i.e., without any slippage therebetween, in the imaging area.

After each incremental portion of the document passes the exposure slit 38 and the corresponding end of the vacuum segment of the vacuum cylinder 40, there is no longer any vacuum acting on that segment of the document sheet. Thus, the only force driving the document forward continuously to the subsequent document transports beyond the vacuum cylinder 40 is the positive engagement between the document and the vacuum cylinder 40 in the vacuum segment, particularly at the nip with the feed roller 51. At no time is vacuum ever applied to any portion of the cylinder 40 other than the less than 90° fixed bottom sector area. Further, no air pressure is required to strip the sheets at the top of the cylinder 40.

In the system disclosed hereinabove, the document recirculation path is the same for both simplex and duplex documents at all times up to the exit of the lead edge of the document from the upper surface of the vacuum cylinder and first inverting roller 40. At that point in this embodiment there is a critical juncture from which two separate return paths are provided to the document storage area 24. There is a first (simplex) return path provided by a simplex belt transport 54 over to and around a second inverting roller or cylinder 56 from which documents are ejected into the tray 28, above and at the rear end of that tray. Alternatively, there is a separate second (duplex) document recirculation return path provided by a second (duplex) document transport 58 directly from the first inverting roller 40 into the front end of the tray 28.

The selection of one of these two paths versus the other is made here by a duplex/simplex switching system including a sheet lead edge deflector finger 60 which pivots between the illustrated solid line (simplex) position and the illustrated dashed line (duplex) position. In the first or simplex position all documents exiting the vacuum cylinder 40 are directed by the finger 60 into the first or simplex transport 54, while in the second or duplex position documents are directed downstream into only the second or duplex transport 58.

It may be seen that by selecting between these two positions of the deflector finger 60 that the simplex transport 54 and its integral second inverting roller 56 may be readily automatically switched in or out of the document recirculation path, in coordination with the recirculation of a document set, to thereby selectively provide in each circulation either a single inversion of each document (by-passing the second inverter) or two inversions in series of each document. The switching of the finger 60 may be accomplished by a conventional solenoid electrically connected to the machine logic controller.

With the single inversion (the duplex path) selected, a document which is initially face down in the tray 28 will be returned face up, i.e., turned over, to the same tray 28 after it is imaged on each circlation. Thus, by the end of the circulation, all the documents in the circulated set will all have been already inverted during the copying circulation itself. With the circulation path with both inversions (the simplex path) selected, each document is returned to the tray 28 in the same orientation it had before being circulated, i.e., without being inverted.

The respective inverting rollers 40 and 56 provide these document inversions, and also a turnaround or change in document movement direction, by each rotating the documents approximately one-half way around the outsides of each roller. Simple uni-directional and basically linear (planar) document transports 54 and 58 may therefor be utilized with this RDH configuration as further described herein.

When the recirculated documents are returned to the document storage area in their original orientation, the same sides of the documents will be copied in the subsequent recirculations of the document set. However, by returning the recirculated documents to the document storage area in inverted orientation, as further described herein, the opposite sides of duplex documents may be immediately copied in the subsequent recirculation of the document set. That is, the even numbered pages of a duplex document may be copied on one circulation, the odd numbered pages copied on the next circulation, the even numbered pages copied on the next circulation, then the odd numbered pages copied again on the next circulation, etc., etc..

It may be seen that the present system is desirably compact. The entire document storage area 24 and both transports 54 and 58 and the document registration and imaging stations are all located internally between the two rollers 40 and 56 providing the two document inverting areas. No exeternal inverting system or path is required. Both the simplex and duplex recirculation paths are continuous and uni-directional, i.e., the movement of the circulated documents does not have to be stopped or reversed at any time, even during the document inversions except for registration. That is highly desirable, since it reduces the potential for jams and reduces the document path lengths.

With the disclosed system the duplex switching is accomplished solely by appropriate actuation of a simple deflector finger or fingers 60 directly adjacent the first inverting roller 40, closely downstream from the imaging station 26. The duplex switching means 60 here is positioned directly in the recirculation path intermediately of the first and second document inversion systems, and operates to selectively bypass the second document inversion system. At the switch 60 both return paths are in the same direction, and nearly parallel, only slightly angularly diverging approximately 20° for the duplex path. Thus, the document does not have to be sharply arcuately deformed to enter either path at the path selection area.

Both document recirculation return paths are short and direct and may be continuously conventionally driven. A simple and direct, single inversion, duplexing system is provided. The initital portion of the circulation path is shared in common by both the simplex and duplex paths through the critical feed-out, operation, registration, imaging, and initial inversion areas, utilizing the same space and the same components.

The two document recirculation paths from the imaging station back to the document storage area are different and distinct from each other and from the common document recirculation path from the document storage area to the imaging station 26. Thus, one document may be being fed from the tray 28 to the imaging station while another document (previously imaged) is being fed from the imaging station back into the tray 28 through either the simplex or duplex document paths. Further, it may be seen that all the documents are entered directly and linearly from the tray 28 into the imaging station 26 in the document recirculation path prior to any inversion of the documents by either of the document inverting systems.

Considering now in further detail the first or simplex document belt transport 54, this comprises here a single opposing and partially overlapping pair of narrow, centrally loated, endless belts 62 and 63. The two belts 62 and 63 transport a document linearly therebetween from the deflector finger 60 at the vacuum cylinder 40 to and around the second inverting roller 56. Documents only enter the transport 54 when the deflector finger 60 is in its simplex (solid line) position. Thus, both belts 62 and 63 may be driven continuously by driving the roller 56, around which they both half-wrap.

The upper transporting flights of both belts 62 and 63 extend horizontally between the upper tangents of the rollers 40 and 56, passing well over (above) the document tray 28. The belt 63 is wrapped at its upstream end around a small roller 64 in that path. The belt 63 then extends linearly to centrally wrap around the outside half of the circumference of the much larger second inverting roller 56. The non-transporting flight of the belt 63 then returns to the roller 64 directly from the bottom of that roller 56.

The mating transport belt 62 is correspondingly mounted at its upstream end at a small roller 66 closely adjacent, and overlying, the upper surface of the vacuum cylinder 40. It then extends to, engages, and travels in overlapping relationship with, the belt 63 from roller 64 to the second inverting roller 56. There, the belt 62 is wrapped directly overlying the belt 63. This forms a positive, sandwiching, central retention of any document between the belts 62 and 63 around the second inverting roller 56. Curved baffles 71 guide outside edges of the documents (especially if dog-earred) around the roller 56. Since both belts engage only the central area of the documents, skew is not induced in the documents by the transport 54. The document is engaged between the two belts 62 and 63 from the roller 64 position to the bottom tangent of the second inverting roller 56. There the first belt 62 is sharply stripped away from the second belt 63 by a small supporting roller 68 to release the documents. The outer (non-transporting) flight of the first belt 62 is then returned to the roller 66 via the roller 68 and two small rollers 69 and 70 spaced from the second inverting roller 56. At the document ejecting point between the rollers 68 and 56 the document is driven in over the top of the stack of documents in the tray 28 from above the rear end thereof but in the same direction of movement as the sheets being fed out by the bottom feeder 32, as shown by the movement arrow there. Thus, the sheets are driven in the direction of the front stack stop 30 in this simplex (dual inversion) return path.

Considering now the second or duplex document transport 58, this duplex document return path is utilized only when the deflector finger 60 is raised to its dashed line position. In this single inversion mode path the documents are transported directly from the top of the first inverting roller 40 onto the tray 28. They are driven in from the front side of the tray in a direction opposite from the direction in which documents are fed out from the bottom thereof, as shown by the movement arrow there. Note that this is at the opposite end of the tray and the opposite movement direction from the simplex path tray entry described above. This transport 58 here is provided by low friction opposing metal sheet guide or baffle surfaces 72 and 74 which are parallel and closely spaced to define the duplex return path, and by continuously driven feed rollers 76 and 78 spaced along that path. The upper baffle 72 extends up to and transitions smoothly into the deflector finger 60. The bottom sheet baffle 74 extends from below the finger 60 and terminates substantially above the front stack stop 30, and, as shown, may be integral therewith.

It may be seen that the overlying baffle 72 also extends down over the central portion of the tray 28 and then up to the second inverting roller 56, adjacent the ejection point of the first transport 54 there, so as to provide a final sheet guide or baffle for the first transport 54 as well. Further, an upper horizontal extension of the baffle 72 here extends horizontally in the simplex path from the finger 60 to support the sides of sheets being only centrally held between the belts 62 and 63.

Positive driving of a document in the duplex transport path 58 is provided here by two pairs of opposiing small diameter foam rollers 76 and 78, which are nipped at openings along the baffle 74 to engage documents directed between the two baffles 72 and 74 by the finger 60. The second pair of rollers 78 is positioned at the output or ejection area of this duplex transport 58.

If desired, by increasing the vacuum segment of the vacuum cylinder 40, it could be utilized for alternatively making multiple copies of a single document continuously held on the cylnder 40 as it rotates, i.e., not entering either of the duplex or simplex transport paths unitl after a pre-set number of copies are made, rather than after one copy as in the system disclosed herein.

Copies are inserted and copied page 1 first, rather than last page first, in the disclosed system for either simplex or duplex docoment copying, i.e., in forward serial order. Thus, job recovery in the event of document or copy sheet jams is simplified. The position of the particular document being copied when the jam occurs and that copy page, relative to the rest of the set can be counted from the beginning of the set, independent of the number of documents in the set. The number of documents copied before the jam will be registered in a conventional counter in the copier logic.

Referring now to FIG. 3, there is disclosed therein a second, alternative, embodiment and example of the RDH unit. This RDH 200 is generally similar to the RDH 20 of FIG. 1, and accordingly only its principal distinctions will be described here. This RDH 200 is designed to operate mounted over an existing platen 202 imaging station of a copier to utilize the existing platen scanning optics. As an example of such a platen scanning optics system there is shown here an optics system of the type utilized in the Xerox Corporation "3100" copier. However, it will be appreciated that any other stationary document scanning or full frame illumination system may be utilized instead. Here there is shown a platen scanning illumination lamp 204. The image of the document is simultaneously scanned by a half-rate mirror system 206, including a split lens/mirror unit 207, to provide a flowing image of the document on the photoreceptor 208.

In this particular example of FIG. 3 of a full document size platen RDH unit 200, the transport and infocus retaining of the document over the imaging station (platen 202) is provided b a wide light-reflecting document belt 210 closely uniformly held over the platen. The registration of the document on the platen 202 may be conventionally provided by a solenoid operated registration gate 214 at the downstream edge of the platen 202, connected to the machine controller.

The belt 210 is mounted here between a large roller 212 (corresponding generally to the roller 40 of FIG. 1) at the downstream or output side of the platen 202 and a smaller roller 213 at the input side of the platen. However, here the roller 212 need not be a vacuum roller. Driving of the document around the roller 212 to provide the initial document inversion is provided by nipping the document against the outer surface of the document belt 10 on the outer side of the roller 212 by a plurality of rollers in a sheet guide 216 there. It may be seen that except for being slightly longer, the simplex and duplex document return paths, and document transports therefor, may be very similar to those previously described for the RDH 20 of FIG. 1. However, here the duplex return path utilizes the upper flight of the belt 210 instead of baffles for most of that return to the document tray from the first inverting roller 212.

Referring particularly to FIG. 2, there will now be described the copier sheet feeder disclosed herein providing an integral normal force applicator and jogger 80 for simply and automatically stacking and aligning sheets as they are inserted into the top of the sheet stack holder and simultaneously providing an appropriate normal force on the stack against the bottom sheet feeder which is feeding individual sheets from the bottom of the same stack. This sheet feeder unit is also shown in side views in FIGS. 1 and 3, incorporated in those circulating document handler embodiments. A slightly different embodiment 122 of this same jogger/normal force concept is incorporated in the duplex copy sheet tray 116 in FIG. 4. However, the following description will be with particular reference to FIG. 2 which shows this system 80 in a partially broken-away perspective view. FIG. 2 also shos portions of the previously described document tray 28, front stack stop 30, and the bottom feeder 32 (including the feed belt 33 and retard pad 34) for separating and feedng out the bottommost individual sheet from the bottom of the stack of documents 22.

This integral normal force applicator and jogger unit 80 includes a jogging roller system rotatably mounted adjacent the front stack stop 30 to engage the top of the stack of sheets in the sheet stack holder. This is provided here by a spaced plurality of soft, highly foraminous, polyurethane foam wheels or rollers 82 secured to a common shaft 84. The shaft 84 is continuously rotated from one end, as shown, in a direction indicated by the arrow of rotation, so that the wheels 82 engage individual sheets fed onto the top of the stack of sheets and move them toward the front stack stop 30.

The shaft 84 is itself mounted for vertical movement relative to the tray 28 (to accommodate differences in the height of the stack of sheets therein) by elongated linear pivotal arms 86 and 87, respectively connecting to the opposite ends of the shaft 84 outside of the opposite sides of the tray 28. The arms 86 and 87 are pivotally mounted on a fixed mounting shaft or axis 80 substantially spaced from the shaft 84 along the arms. The shaft 88 is positioned centrally and spaced above the tray 28. The same pivot axis 88, may, of course, be provided by separate pivotal connections at each side for each arm, eliminating a central shaft there.

The arms 86 and 87 extend linearly beyond the other side of the mounting shaft 88 from the shaft 84 to a counterbalance or counterweight 90. The downward force of the counterweight 90 acts on lever arms provided by the length of arms 86 and 87 from the mounting shaft 88 to the counterweight 90. This provides a corresponding lifting or counterbalancing force through the other lever arms provided by the length of arms 86 and 87 between the pivot axis 88 and the shaft 84. This counterbalances a desired portion of the weight of the entire normal force unit comprising the wheels 82, shaft 84, and associated components. If desired, this counterbalancing may be made adjustable by any suitable means, such as the illustrated adjustable mounting slots for the mounting position of the counterweight 90 on the arms 86 and 87.

Although not essential, as shown in FIG. 2 the front stack stop 30 may be apertured at the locations of the wheels 82 to allow the fronts of the wheels 82 to extend beyond the front stack stop 30. This allows the nip between the wheels 82 and the stack of sheets to be directly adjacent the front stack stop, thereby overlying the bottom feeder 32 along a line directly across the entire front edge of the stack closely adjacent the retard nip between the feed belt 33 and the retard pad 34.

The above-described mounting and counterweighting of the integral normal force applicator and jogger unit 80 causes the set of jogging rollers 82 to be uniformly pressed against the top of a stack of sheets in the sheet stack holder with sufficient force to provide a normal force for the bottom sheet feeding system 32 regardless of the number or weight of sheets in the stack. It also provides a sufficient engagement force between the wheels 82 and the top sheet to drive the top sheet against the front stack stop. However, this normal force is sufficiently low to allow the wheels 82 to continuously slip once the top sheet is abutted against the stack stop, without buckling the sheet or driving the top sheet beyond the front stack stop, or abrading the sheet.

It is important to note that the unit 80, particularly the wheels 82, are not lifted as each sheet enters the tray, nor is the bottom feeding interrupted, as would be required with various conventional holddown normal force applicators.

The specific normal force may vary, depending on the number, size, and material of the wheels 82, providing the described functional characteristics of their action on the sheets are satisfied. The use of multiple foraminous wheels for document or other sheet handling per se is taught in art cited in the introduction and elsewhere.

It will be appreciated that other weighting or spring biasing means may be provided to compress or impose the desired continuous but light normal or holddown force on the stack through the wheels 82. This normal force desirably allows a non-vacuum bottom sheet feeder to be used reliably even for small stacks of only a few sheets.

The jogging wheels 82 are sufficiently soft and foraminous to deformably lightly engage the sheet without marking or damaging that sheet with the above-described pre-set light normal pressure even with continuous slippage, and thus may be desirably kept turning continuously during the operation of the copier to continuously maintain a forward force against the stack and to continuously accept and feed in individual top sheets, independently of the operation of, and simultaneously with, the operation of the bottom feeder 32. Thus, this jogger unit automatically positions all of the sheets at the forward edge of the tray and provides for continuous top input and bottom output.

The continuously rotating foraminous wheels 82 have a rough surface and continuously downwardly moving rear surfaces, i.e., at their sides opposite from the front stack stop. The wheels 82 have equal diameters so that they may all simultaneously engage the front edge of the sheet. Thus, the edge of any sheet engaging these wheels 82 is pulled down onto the stack by the wheels, and then pulled forward under the wheels. Thus, each top sheet is pulled down, captured in the wheel nips, and slid forward on the top of the stack under the wheels into alignment with the front stack stop.

If the top sheet is initially skewed, so that one side of its lead edge engages the stack stop before the other, the wheels 82 overlying that side of the sheet will begin to slip while the other wheels 82 will continue to feed the other side of the sheet forward into full alignment with the front stack stop. To this end, the wheels are desirably spaced so that both sides of the sheet are engaged by at least one wheel 82, as shown.

The wheels 82 are relatively small in diameter, e.g., less than approximately 2 centimeters, particularly in relation to the much greater distance between wheels 82 and the mounting shaft 88. There is a large and totally unobstructed opening in this area, much wider than the maximum width of a sheet to be placed in the tray 28, and much wider than the tray 28 itself. This opening is specifically adapted for the unobstructed passage of sheets over the front stack stop 30 and over the entire jogger wheel unit onto the stack of sheets in the tray 28. Thus, as described above in connection with the operation of the duplex transport path 58 in FIG. 1, sheets may be fed into the tray 28 from the front thereof in a direction opposite the sheet feeding direction while sheets are being simultaneously fed out from the bottom of the stack in the same tray at the same time. The mounting of the wheels 82 by the widely spaced arms 86 and 87, and their being driven from an outside end adjacent one of those arms, (as opposed to the shaft 84 being conventionally centrally mounted and driven) allows this area over the wheels 84 and shaft 82 to be completely unobstructed at all times for such front loading.

In the embodiment of FIG. 1 an additional rear nudger or jogger 92 is shown at the rear end of the sheet stack holder opposite from the jogging roller unit 80 for engaging and urging any sheets fed thereagainst toward the jogging roller wheels 82. This rear jogger 92 does not drive the sheets against the front stack stop 30 as with a conventional rear jogger, since that is accomplished here by the continuously rotating wheels 82 once they engage the sheet. Where the tray is downwardly inclined towards the front stack stop, as in FIG. 4, the rear jogger is, desirably, eliminated.

Referring to FIGS. 1 and 2, there is shown a further feature of the copier sheet feeder system disclosed herein. This is an inter-relation of the bottom sheet feeder 32 with the integral normal force applicator and jogger unit 80 described above. Specifically, as shown in FIG. 1, the portion of the frictional document feed belt 33 extending under the bottom of the stack of documents 22 (in an aperture in the bottom of the tray 28) is held by its supporting rollers there so that the feed belt 33 is maintained slightly (e.g., approximately 0.3 centimeter) above the plane of the tray 28, but generally planar and parallel the tray bottom. As shown in FIG. 2, this sheet pull-out portion of the belt 33 extends between the two center-most jogger/normal force rollers 82. That is, two of these rollers 82 are spaced closely adjacent opposite sides or edges of the raised portion of the belt 33, and no roller 82 overlies the feed belt 33. This causes a slight upward buckling of the forward central area of the stack of sheets in the tray 28 over the belt 33. The foam rolls 82 pressing down at opposite sides thereof confine this buckle over the belt 33 to maximize the normal force between the sharp edges of the belt 33 and the bottom sheet and minimize the normal force between the central area of the belt 33 and the bottom-most sheet. That is, the normal force applied by the rollers 82 is concentrated at the edges of the feed belt 33 to increase its feeding reliability, while the buckling of the bottom sheet over the central portion of the feed belt 33 reduces the tendency for image smearing due to slippage between the feed belt and the sheet.

Referring now to FIG. 4, there is shown therein an exemplary copier 10 in accordance with the present invention. This view of FIG. 4 is partly schematic to particularly emphasize the copy sheet path of the copier 10, to which the following description will be particularly directed.

Referring first, however, to the image input to the copier 10, there is shown in FIG. 4 the imaging station 26 of the simplex/duplex recirculating document handling unit 20 previously described with reference to FIGS. 1 and 2. Also shown is the optics system described there for imaging each document onto the photoreceptor 12. The photoreceptor 12 here has the normal xerographic imaging, development, transfer, stripping, and cleaning stations acting thereon to develop the document image on the photoreceptor 12 with fusable toner material and to transfer that image to one side of a copy sheet at a transfer station 112. That transferred page image is then fused to the sheet at the fusing station 114.

In the copier 10, clean (unimaged) copy sheets may be fed into the transfer station 112 from either of two copy sheet trays 106 or 107. After transfer and fusing has been accomplished, the copy paper output path arcuately bends as shown to transport the copy sheets to which an image has just been fused on one side out toward an exit area.

The above-described features of the copier 10 are generally similar to that of the Xerox Corporation "4000" and "4500" copier and need not be further described in detail herein. However, in the copier 10, as the fused copy sheet is being transported out toward its normal exit area it passes through significantly different structural and functional features. First, each copy sheet passes through a gate comprising here a duplex selector finger 118. Depending on the position of this finger or gate, the copy sheet will either be directly passed out through a transport 126 or captured in a duplex buffer storage tray 116. These structures are shown in simplified form here to clarify their operation, and it will be appreciated that other structures providing their function as described below may be substituted.

Assuming that the deflector finger 118 is positioned by the controller 100 in its raised position illustrated here, the lead edge of each approaching copy sheet (on which a document page has just been copied on one side thereof) is deflected by the finger 118 down onto the top of the stack of sheets present in the duplex tray 116. As the lead edge of the copy sheet reaches the far or upstream end of the tray 116 it strikes a foam rubber or other suitable bounce pad or reverser 120. The resiliency of the pad 120 coupled with the downwardly inclined orientation of the tray 116 causes the copy sheet to then reverse its direction of movement. What was previously the trail edge of the sheet now has cleared the finger 118 and is now directed backwards against a set of jogger/normal force wheels 122 adjacent the front or downstream edge of the stack 116.

These wheels 122 are similar in structure and function to the integral normal force applicator and jogger unit 80 wheels 82 separately described herein in relation to FIG. 2. The wheels 122 here are desirably somewhat larger in diameter than the wheels 82 so as to insure capture and pulling down of the trail edge of the copy sheet even if it is still "floating" above the other sheets in the stack. The wheels 122 capture what was the trail edge of the entering copy sheet and stack it under the wheels in alignment with the front stack stop of the tray 116 at its downstream or forward edge.

The tray 116, similar to the tray 28 of FIG. 1, has a bottom retard feeder 124 for feeding individual sheets from the bottom of the tray 116. This may be separately or simultaneously with the feeding in and stacking of individual sheets on the top of the stack of sheets in the tray.

As in the tray 28 of FIGS. 1 and 2, the copy sheets enter the top of the tray 116 in a direction opposite from that from which copy sheets are fed out of the bottom. The incoming sheets are fed in over the tops of the jogger/normal force rollers 122 at the same front edge of the tray from which the sheets are fed out, rather than from the rear or upstream side of the tray.

It may be seen that due to the inversion in the copy sheet path from the transfer station 112 and fuser 114 to the tray 116, that the copy sheets are inverted by the time they reach the tray 116. That is, the images just transferred to the copy sheets entering the tray 116 are all on the top side thereof, and not on the opposite or bottom side from which they are fed by the feeder 124. Thus, the feeder 124 here can feed sheets from the clean side thereof directly into the feeding and registration path to the transfer station 112 for the transfer of the second (odd page) document images to the second, clean (previously uncopied) side of the copy sheets which were stored in the tray 116.

Considering now the operation of the copier 10 when the deflector fingers 118 are in their second, lowered position, illustrated by the dashed outline, this causes all of the copy sheets coming from the fuser 114 to be deflected into the transport 126. The transport 126 passes over the top of, and by-passes, the tray 116, in a closely adjacent, compact, manner. The copy sheets being fed out by this over-tray transport 126 then enter an output inverter unit 128 which includes a further selector or deflector gate operated by the controller 100. There the copy sheets may selectively be either inverted and immediately ejected into an inverted output tray 130 or further transported into a finishing station 140 for automatic stapling or other appropriate finishing operations.

With reference to the copier 10 of FIG. 4, by way of example, there will now be described a method of automatically copying the images on both sides of recirculated duplex documents onto both sides of copy sheets to make any desired number of pre-collated duplex copy sets in an efficient and continuous manner. First, as elsewhere further described here, only the even page sides of all the duplex documents in the duplex document set placed in the tray 28 are sequentially imaged at the imaging station 26 in the first document circulation. These sequential images of the even pages are copied onto a first side of a corresponding number of copy sheets sequentially fed from either of the (clean) copy sheet trays 106 and 107, at the transfer station 112. As all of these (now simplexed) even numbered copy sheets exit the transfer station 112, they are all temporarily stored in a buffer storage area, provided here by the tray 116. On this copying circulation of the even sides of the documents none of the copies are exited to the output of the copier.

During all but the last copying circulation of the duplex documents all of them are inverted, so that at the end of every even side circulation all of the documents have been inverted and their odd sides are ready to be exposed and copied. Then, on the next circulation of all of the documents in the document set, all of only the odd page sides of the documents are imaged. Those odd page images are all transferred to the opposite (previously unimaged) sides of copy sheets fed suquentially by the bottom feeder 124 only from the duplex tray 116. After the transfer and fusing of this second side image, these copy sheets, which have now already been duplexed in the second circulation of the duplexed documents, are all exited from the copier to the output tray or finisher by the switching of the deflector finger 118 prior to this second document copying circulation. No copies are put into the tray 116 on any odd side exposed circulation of the documents. Thus, a completed duplex copy set is ejected from the copier on the second, and each subsequent, odd side document circulation, and the duplex tray 116 is emptied and is ready to receive simplexed documents on the next (even) document circulation.

Since all of the documents are again inverted during the second document circulation, upon the third document circulation only the even sides of the document set are copied once again onto a new set of copy sheets fed from the trays 106 or 107 to repeat the previously described operation. The above-described steps are repeated in the above sequence by the number of times corresponding to the desired number of copy sets to be made from the documents.

A single set of document even side copy sheets is the most that is stored in the duplex tray 116 at any time. The maximum number of these stored copy pages is equal to only the number of even document pages copied, independent of the number of copies made of the documents.

It will be noted that the operation and function of the deflector 118 and duplex tray 116 will vary, depending on the type of copying selected. By selecting appropriate copier external switches, in a known manner, the controller 100 is directed to operate the paper path and paper feeder functions described above, or otherwise, automatically through conventional solenoid, clutch, cam or other drives. For example, when it is desired to utilize the copier 10 to conventionally make simplex copies of simplexed documents, rather than duplex/duplex copying as described above, the deflector finger 118 is set to deflect all copy sheets directly to the output area, and the tray 116 is not utilized. Conversely, when simplex documents are to be duplex copied onto duplex copy sheet sets, as further described hereinbelow, the operation of the sheet feeder 124 from tray 116 is alternated with the sheet feeder of tray 106 or 107, to alternate feeding of simplexed or blank copy sheets to the transfer station 112, and the deflector 118 is switched between each copy sheet to alternately deflect the simplexed copies into the tray 116 and the alternatively completed duplex copies to the desired output.

Alternately, when the copier 10 and the RDH 20 is utilized for making simplex copies from duplex documents, this may be done different ways. One known way would be to make one set of copies of the otherwise hidden sides of the duplex documents, e.g., all the even sides, and interleave those copies with the other documents to form in effect a pseudo-simplex document set which can then be copied as such. Another method would be to utilize the above-described automatic duplex document recirculation system in which a set of even page simplex copy pages would be made in one document circulation, a set of odd simplex copy pages would be made in the next document circulation, etc.. This, however, would then require interleaving of the odd and even simplex copy pages to form a completed simplex copy set from the duplex originals.

In the disclosed method of making duplex copy sets from duplex documents, it is desirable for the operator to be able to initially load the documents in the document handling unit in a normal pre-collated forward serial numerical order. That is, the duplex documents may be loaded here face down into the tray 28 in their normal page 1, 3, 5, etc. order. (It will be appreciated that in an RDH in which the documents are inverted before they are copied that the set may be initially inverted). Yet, as otherwise described herein, it is advantageous to first copy the even pages and to store those even page copies in the buffer tray 116, and not odd page copies. This is accomplished here by first operating the RDH 20 for an initial single document circulation in which none of the documents are copied and in which no copy sheets are fed. This initial "blind" circulation of the documents reorients the documents in the tray 28 appropriately for the copying of the even pages first on the first actual copying circulation of the documents. Thus, the first copying circulation of the even pages may then immediately preceed without requiring any operator intervention.

At the completion of the copying of the duplex documents onto the desired number of duplex copy sets, it will be appreciated that the document set could be additionally circulated in (another) final non-copying circulation to return them to their forward serial order collation, so that they may be removed by the operator in the desired order in which they were initially placed in the tray 28 by the operator. However, it has been found that the same result can be achieved without requiring such a second non-copying circulation. This is accomplished here during the last copying circulation of the document set by switching the deflector finger 60 in the RDH unit 20 to cause the duplex document set to follow the simplex transport 54 path back to the tray 28 on only this last circulation, rather than the duplex path utilized for all of the previous circulations. That is, the duplex documents are not inverted in their last copying circulation. This automatically recollates the documents in forward serial order during the last copying run or circulation so that they may be removed from the tray 28 immediately after the completion of copying in their desired order.

It should be noted that in the duplex document copying system disclosed herein that all the same sides of all the documents in the documents set are all imaged in each circulation. That is, all odd sides are copied or all even sides are copied. No document sheets with images on them are skipped (not copied) in their circulation on either duplex or simplex document copying, except on the first circulation of duplex documents for duplex/duplex copying and on the first and last circulation of simplex documents for simplex/duplex copying as further described herein. For all circulations, regardless of whether odd or even sides are being imaged, and for either duplex or simplex documents, the documents are imaged at the same, single, imaging system and by the same, unchanged, optics system.

In the duplex/duplex copying system described herein, it is desirable to begin copying, i.e., the first copying circulation of the duplex documents, with the even pages, i.e., the even numbered sides of the duplex documents. One reason for copying the even document pages first is that in a duplex document set if there are an uneven number of pages the last duplex document sheet will actually be a simplex document. For example, a five page duplex document set would normally have pages one and two on opposite sides of the first document sheet, pages three and four on opposite sides of the second document, but page five on only one side of the third document, with the other side of the third document being blank (i.e., no actual page six). By copying the even sides (even pages) first, only pages two and four need to be copied, on only two copy sheets, in the first document circulation. Thus, only two copy sheets need to be stored in the duplex buffer storage tray on the first document circulation. By the operator informing the copier (with switch settings) of the (uneven) number of pages and the fact that the documents are duplex documents, the copier can be automatically pre-set to skip (avoid copying) the last even page in each document circulation of the even sides. That is, in this example, the even side of the third document sheet, which would otherwise be page 6, is not copied, and no third copy sheet is fed to receive a blank page six image. Thus, the transfer, fusing, and feeding of a final blank unprinted copy sheet into the duplex tray is avoided in the circulation of the even page sides of the documents for copying.

On the next document circulation, wherein the odd document pages are copied, page 1 will be copied on the reverse side of the copy sheet on which page 2 was printed in the prior document circulation, by feeding that same copy sheet from the duplex tray. Likewise, page 3 is printed on the back of the copy sheet on which page 4 had just previously been printed. However, the last odd page, page 5 in this example, can be automatically printed on a clean copy sheet fed from the copy sheet tray rather than from the duplex tray. Thus, the final copy sheet of the copy set, on which page 5 is printed here, does not have to go through the transfer and fusing station twice, and never has to go in or out of the duplex tray. It may be seen that these same advantages hold for all subsequent circulations (pre-collation copying set cycles).

As described in the above-cited Adamek, et al. U.S. Pat. No. 4,116,558, duplex copies can also be provided here rapidly and efficiently in precollated output copy sets from a set of simplex documents recirculated in serial order by a different method than that described above for duplex documents. In the first copying circulation of the simplex document set only the even-ordered (e.g., pages 2, 4, 6, etc.) documents are copied (once) onto the first sides of the copy sheets, skipping (not copying) all the odd pages. Those copies are transported to the duplex buffer storage area. Then on the next, and all but the last, document circulations, individual copies are made, in order, of all the document pages, odd and even, but alternately copying the odd order documents on the reverse side of the previously simplexed copies fed from the duplex buffer set while alternately copying the even ordered documents onto clean copy sheets fed from one of the copy sheet trays. The finished duplexed copies made from the buffer set are transported to the output to accumulate as pre-collated duplex copy sets, while simplexed copies made from the even document pages are fed to the buffer tray to replace the copies being fed therefrom. All of the document pages in the set are repeatedly individually copied in the latter manner in a number of document recirculations equal to one less than the total number of copy sets desired. Then, for the last copy set, copies are made of only the odd ordered documents onto the reverse sides of copies fed only from the duplex buffer tray.

As taught in the above-cited U.S. Pat. No. 4,116,558 to Adamek, et al. for simplex/duplex copying it is desirable to copy only the even page numbered documents on the first copying run. As stated there, the odd numbered documents could be imaged on the first pass of the ADH instead. However, as stated there, to do so would require an extra pass of the last copy sheet through the transfer station without putting an image on the even side thereof in the copying of an odd numbered document set, e.g., a set of 5 documents. Alternatively, if one did not make an extra pass, an inverter would have to be used to insure proper orientation of the last odd copy sheet. One pitch on the imaging member (photoreceptor) would in most systems also then have to be skipped in order to provide time for the last sheet to be properly oriented in the output tray. Thus, as stated there, the aforementioned requirements are eliminated by imaging even numbered documents first, regardless of whether a document set comprises an odd or even number of documents.

Various sheet sensors and switches, including those of the type disclosed in the art cited herein, may be desirably incorporated in the RDH unit and other copier systems disclosed herein. For example, shown in FIG. 1 is a sensing switch 29 in the tray 28 which is actuated whenever any documents are placed therein. Actuation of the switch 29 automatically actuates the machine components associated with the RDH mode of copier operation, including the flipping of the mirror 55. Conversely, when the set of documents are removed from the tray 28, the switch 29 automatically opens to automatically cycle the copier back into its platen-copying mode of operation. The number of documents in the document set being copied is counted during the first copying circulation. A bail set counter switch as shown in the cited art, which is set on top of the stack as it is initially loaded, self-actuates when the last document is fed to indicate the completion of the set count. This bail switch does not need to be reset for subsequent circulations as the document count in the first circulation is stored automatically in the copier logic for job recovery and other functions for all subsequent circulations of that set.

The following is a description of a system for automatically providing the previously noted second method of making pre-collated simplex copy sets from duplex documents. This system may utilize the duplex/duplex document recirculation system and apparatus described above and also the copy sheet handling apparatus of FIG. 4 described above. Yet the simplex copy set output from the duplex document copying is automatically interleaved to provide pre-collated simplex copy sets.

Taking, for example, a five page, three sheet, duplex document set; on the first document copying circulation the even-order pages 2 and 4 [and, if desired, the blank page 6 side] are each copied onto one side of clean copy sheets and those two copy sheets are placed, face-up, in that order, in the duplex buffer storage tray 116 i.e., with copy page 2 face-up on the bottom of the tray and copy page 4 face-up on top of page 2. Then, on the next document set circulation, the odd-order side document pages 1, 3 and 5 are copied onto one side of each of three more clean copy sheets from trays 106 and 108. However, page 1 is fed directly from the transfer station to the output or finishing station. Then, before page 3 is copied, page 2 is fed from the tray 116 directly to the output or finishing station. Then page 3 is copied and fed out as was page 1. Then page 4 is fed out from tray 116 as was page 2. Then page 5 is copied and fed out as was page 1. This provides a full interleaved simplex copy set at the copier output at the end of the second duplex document circulation. Then, on the next document circulation, pages 2 and 4 are again copied and fed into the tray 116 for temporary storage before being ejected as previously described. These steps are repeated by a number of times related to the number of desired precollated simplex copy sets.

For the above-described duplex/simplex copying system it is desirable here to provide an automatically actuatable or insertable conventional "Y" sheet path reverser at the output of the sheet feeder 124 from the tray 116, so as to feed the even page simplex copies face-up into the output path 126 without changing their lead to trail edge orientation. This can be accomplished by automatically reversing the direction of motion of the sheet feed rollers 125 shown downstream of the feeder 124 as soon as the trail edge of the sheet clears the feeder 124. Alternatively, another bottom feeder, feeding in the opposite direction from the feeder 124, could be placed at the other end of the tray 116. Maintaining face-up orientation of these even page copy sheets is desired here to match the face-up orientation here of the odd page copies coming from the transfer station.

This feeding of even page copies directly to the output from tray 116 is clearly preferable to feeding copies from the tray 116 back through the transfer station 112 before they are outputed from the copier, since the latter path would require additional time and the undesired transfer and fusing of "background" contamination of the blank backs of these simplex copy sheets.

It will be noted that to maintain forward serial page order collation of the outputed simplexed copy sets with the particular copy sheet paths of FIG. 4 that an inverter, as shown in the output path to tray 130, is needed to provide face-down output, since this particular copy sheet output path otherwise has a face-up output for simplex copies.

What is claimed is:

1. In an automatic document recirculating system for pre-collation copying of a set of documents wherein recirculation means are provided for multiply recirculating a set of individual documents in a recirculation path from document storage means to document imaging means for copying the individual documents and back to said same document storage means, the improvement comprising:

first document inversion means in said document recirculation path for inverting documents being recirculated in said document recirculation path by said recirculation means;

second document inversion means in said document recirculation path for further inverting documents being recirculated in said recirculation path; and duplex/simplex switching means in said document recirculation path for selecting between duplex and simplex copying of the documents being recirculated, said duplex/simplex switching means having first and second switching positions for selectively switching said second document inversion means in and out of said document recirculation path in coordination with the recirculation of a document set by said recirculation means, said duplex/simplex switching means in said first switching position returning the recirculated documents in each document recirculation to said same document storage means in inverted orientation after each document has been copied once on only one side, for copying opposite sides of the documents on alternate recirculations of the document set, and said duplex/simplex switching means in said second switching position returning the recirculated documents in each document recirculation to said document storage means in their original orientation for copying the same sides of the documents in the subsequent recirculations of the document set, wherein said duplex/simplex switching means includes first and second document transport means and movable document deflection means for deflecting documents between said first and second document transport means, and wherein said document deflection means is adjacent said first document inversion means, and wherein said first document transport means transports documents from said first document inversion means to said second document inversion means, and wherein said second document transport means transports documents from said first document inversion means to said document storage means, and wherein said second document inversion means comprises a rotatable non-vacuum roller, and wherein said first and second document transport means include respective first and second narrow belt flights, both partially centrally wrapped around said roller, for transporting a document between said first and second belt flights partially around said roller.

2. In an automatic pre-collation copying system for pre-collation recirculating copying of a set of duplex original documents, from a document storage means, at a document imaging means of a copier for copying the documents onto copy sheets to form pre-collated copy sets, wherein said copier has at least one copy sheet supply means and a separate copy sheet intermediate storage means and a copy sheet output means, and wherein said copier has an image transfer station for transferring images of the documents onto one side of copy sheets fed from either said copy sheet supply means or said copy sheet intermediate storage means, the improvement comprising:

duplex document recirculation means for multiply circulating said set of duplex documents in a recirculation path from said document storage means to said document imaging means for copying all of one sides of said documents once in each circulation and for returning said documents back to said same document storage means in each circulation, said duplex document recirculation means including inversion means for inverting said circulating documents in each circulation before they are returned to said document storage means relative to their initial orientation so that on alternate circulations of said documents alternate sides of said documents are copied by said document imaging means, and duplex copy sheet handling means for feeding all of the copies, made on one of the alternate circulations of the duplex documents, from said copy sheet supply means through said transfer station and into said copy sheet intermediate storage means, and for feeding all of the copies, made on the other of the alternate circulations of the duplex documents, from said copy sheet intermediate storage means through the transfer station again, inverted, and to said copy sheet output means, so that pre-collated duplex copy sets are produced at said copy sheet output means on alternate circulations of said duplex documents by said duplex document recirculation means, wherein said duplex document set is stacked in said document storage means and wherein said duplex document recirculation means, during said document circulation, continuously removes the bottom-most sheet from said stack of documents in said document storage means and continuously restacks each document being circulated in order but inverted on the top of said stack after it has been copied.

3. In an automatic pre-collation copier for pre-collation recirculating copying of a set of original document sheets stacked in a document storage means with document imaging means onto copy sheets to form pre-collated copy sets, wherein said copier has at least one copy sheet supply means and separate copy sheet intermediate storage means and copy sheet output means, and wherein said copier has a transfer station for transferring images of the documents from said imaging means onto one side of copy sheets fed from either said copy sheet supply means or said copy sheet intermediate storage means, the improvement, for so copying duplex documents, comprising:

duplex document recirculation means for multiply circulating a set of duplex documents in a recirculation path from said document storage means to said document imaging means for copying all of one sides of said documents in said set once in each circulation and for returning said documents back to said same document storage means in each circulation;

said duplex document recirculation means including selectable inversion means for selectably inverting or not inverting said circulating documents during a copying circulation as returned to said document storage means relative to their initial orientation in said document storage means;

said duplex document recirculation means, during said copying circulation in which said documents are selectably inverted, continuously removes the bottom-most document from said same stack of duplex documents in said document storage means and continuously restacks each document being circulated in order but inverted on the top of said stack after it has been copied so that in the next subsequent recirculation of said documents after they have been so selectively returned inverted the sides of said documents which are copied at said document imaging means are opposite from the sides of the documents copied in said preceding said circulation, and duplex copy sheet handling means for feeding the copies made from one of the sides of the duplex documents from said copy sheet supply means through said transfer station and into said copy sheet intermediate storage means, and for feeding the copies made from the other of the sides of the duplex documents from said copy sheet intermediate storage means through the transfer station again, inverted, and to said copy sheet output means, so that multiple pre-collated duplex copy sets are produced at said copy sheet output means during multiple circulations of said duplex documents by said duplex document recirculation means.

4. The automatic pre-collation copying system of claim 3, wherein said selectable inversion means comprises means for switching the number of inversions of said duplex documents in said recirculating copying path of said documents between said removal and return of said documents to said document storage means from a first path with two inversions to a second path with one inversion wherein said path with one inversion returns said documents inverted to said document storage means, and wherein said one inversion is common to both paths.

5. The automatic pre-collation copying system of claim 3, wherein said duplex document recirculation means removes said documents from only one end of said document storage means.

6. The automatic pre-collation copying system of claim 5 wherein said selectable inversion means comprises means for switching the number of inversions of said duplex documents in said recirculating copying path of said documents between said removal and return of said documents to said document storage means from a first path with two inversions to a second path with one inversion wherein said path with one inversion returns said documents inverted to said document storage means, and wherein said one inversion is common to both paths.

7. The automatic pre-collation copying system of claim 5, wherein said duplex document recirculation means returns said duplex documents to said same one end of said document storage means when they are returned inverted, but returns said duplex documents to an opposite end of said document storage means when said documents are returned not inverted.

8. The automatic pre-collation copying system of claim 7 wherein said selectable inversion means comprises means for switching the number of inversions of said duplex documents in said recirculating copying path of said documents between said removal and return of said documents to said document storage means from a first path with two inversions to a second path with one inversion wherein said path with one inversion returns said documents inverted to said document storage means, and wherein said one inversion is common to both paths.

9. The automatic pre-collation copying system of claim 7 wherein said same duplex document recirculation means is additionally operable for the copying of simplex documents by selectably operating said inversion means to return said simplex documents to said document storage means in their initial orientation for all circulations thereof.

10. The automatic pre-collation copying system of claim 5 wherein said same duplex document recirculation means is additionally operable for the copying of simplex documents by selectably operating said inversion means to return said simplex documents to said document storage means in their initial orientation for all circulations thereof.

11. The automatic pre-collation copying system of claim 3, wherein said same duplex document recirculation means is additionally operable for the copying of simplex documents by selectably operating said inversion means to return said simplex documents to said document storage means in their initial orientation for all circulations thereof.

12. In automatic document recirculating means for pre-collation copying of a set of individual document sheets by multiply recirculating said set of documents in a copying circulation path extending from the bottom of a stack of documents in a document storage means to a document imaging means of a copier, and then returning to the top of said same stack in said storage means, for copying each document once in each said circulation, the improvement for precollation copying of duplex documents, comprising:
  first document inversion means in said document copying circulation path for inverting once the documents being circulated for copying by said recirculation means:
  second document inversion means in said document copying circulation path in series with said first document inversion means for inverting a second time the documents being circulated for copying by said recirculation means; and
  duplex/simplex switching means in said document copying circulation path having first and second switching positions for respectively selectively switching one of said first or second document inversion means effectively in or out of said document copying circulation path,
  said document recirculating means, with said duplex/simplex switching means in said first switching position, returning the documents in said document copying circulation path back to said same document stack in inverted orientation relative to their initial orientation therein after each document has been copied and inverted only once in said circulation by passing completely through only one of said first or second document inversion means, for copying the opposite sides of the documents in the next subsequent circulation of the document set, and
  said document recirculating means, with said duplex/simplex switching means in said second switching position, returning the documents in said document copying circulation path back to said same document stack in their original orientation after each document has been copied and inverted twice in said circulation, by passing through both said first and second document inversion means, for copying the same sides of the documents in the next subsequent circulation of the document set.

13. The automatic document recirculation means of claim 12, wherein said duplex/simplex switching means returns said documents in said circulation path to one end of said document storage means in said first switching position and to the opposite end of said document storage means in said second switching position.

14. The automatic document recirculating means of claim 12, wherein only a single sheet feeder at only one end of said document storage means feeds said documents therefrom.

15. The automatic document recirculating means of claim 14 wherein said duplex/simplex switching means returns said documents in said circulation path to one end of said document storage means in said first switching position and to the opposite end of said document storage means in said second switching position.

16. The automatic document recirculating means of claim 12, wherein said first and second document inversion means are located adjacent opposite ends of said document storage means, and comprise large diameter rollers and means for transporting said documents partially around said rollers, and wherein said duplex/simplex switching means comprises sheet deflector means adjacent one of said rollers to deflect documents from said one roller into one of two different paths in said copying circulation.

17. The automatic document recirculating means of claim 16 wherein said duplex/simplex switching means returns said documents in said circulation path to one end of said document storage means in said first switching position and to the opposite end of said document storage means in said second switching position.

18. In a method of pre-collation copying of a set of individual document sheets by multiply circulation said set of documents in a copying circulation path extending from the bottom of a stack of said documents in a document storage means to a document imaging means of a copier and then returning to the top of the same stack in said same storage means, for copying each document once in each said circulation; the improvement for the selective pre-collation copying of duplex or simplex documents comprising:
  when said documents in said stack are simplex documents, inverting the documents being circulated for copying twice in each copying circulation to return them back to the top of said same document stack in their original orientation therein after each document has been copied and inverted twice in said copying circulation, and, thereby, copying the same sides of the documents in the next subsequent circulation of the document set,
  and, when said documents in said stack are duplex documents, inverting only once the documents being circulated for copying in a copying circulation to return them back to the top of said same document stack in inverted orientation relative to their initial orientation therein after each document has been copied and inverted once in said copying circulation path, and, thereby, copying the opposite sides of the documents in the next subsequent circulation of the document set.

19. The method of pre-collation copying of claim 18, wherein said circulation path with said inverting twice step is provided by rotating the documents through two large diameter roller inverters in series but spaced at opposite ends of said document storage means, and wherein said inverting only once step is provided by effectively bypassing one of said roller inverters.

20. The method of pre-collation copying of claim 18, wherein all said circulations of said document set other than, at most, the first and last circulations, are copying circulations, for either duplex or simplex documents.

21. The method of pre-collation copying of claim 18, wherein said document circulation path is common for both said duplex and simplex document sets for one said inversion in said copying circulation.

22. The method of pre-collation copying of claim 18, wherein said duplex documents are stacked in said stack in their normal forward serial page order, and are first copied on their even numbered sides in the first said copying circulation, and are copied in forward serial order in all circulations.

23. The method of pre-collation copying of claim 18 further including the steps of:

sequentially copying all of the first sides of all of the duplex documents in a duplex document set being circulated for copying onto the first sides of corresponding copy sheets fed from a copy sheet supply to produce simplexed copy sheets of said first sides of said documents, temporarily storing said simplexed copy sheets in a buffer storage area, then sequentially copying the second sides of the duplex document set in a subsequent copying circulation onto the second sides of said simplexed copy sheets fed from the buffer storage area to form completed precollated duplex copy sets from said duplex documents.

24. The method of pre-collation copying of claim 23 wherein said document circulation path is common for both said duplex and simplex document sets for one said inversion in said copying circulation.

25. The method of pre-collation copying of claim 23 wherein all said circulations of said document set other than, at most, the first and last circulations, are copying circulations, for either duplex or simplex documents.

26. The method of pre-collation copying of claim 23, wherein said simplexed copy sheets are stacked into said buffer storage area, from the top of the stack, and removed from said buffer storage area from the bottom of the same stack.

27. The method of pre-collation copying of claim 23, wherein said documents are circulated and copied in the same serial order direction for each said cirulation thereof, wherein all said circulations of said document set other than, at most, the first and last circulations, are copying circulations, for either duplex or simplex documents, and wherein said document circulation path is common for both said duplex andd simplex document sets for one said inversion in said copying circulation.

28. The method of pre-collation copying of claim 23 wherein said circulation path with said inverting twice step is provided by rotating the documents through two large diameter roller inverters in series but spaced at opposite ends of said document storage means, and wherein said inverting only once step is provided by effectively bypassing one of said roller inverters.

29. The method of pre-collation copying of claim 23 wherein said duplex documents are stacked in said stack in their normal forward serial page order, and are first copied on their even numbered sides in the first said copying circulation, and are copied in forward serial order in all circulations.

30. The method of pre-collation copying of claim 18, wherein said documents are circulated and copied in the same serial order direction for all said circulations thereof.

31. The method of pre-collation copying of claim 30 wherein said circulation path with said inverting twice step is provided by rotating the documents through two large diameter roller inverters in series but spaced at opposite ends of said document storage means, and wherein said inverting only once step is provided by effectively bypassing one of said roller inverters.

32. The method of pre-collation copying of claim 30 wherein all said circulations of said document set other than, at most, the first and last circulations, are copying circulations, for either duplex or simplex documents.

33. The method of pre-collation copying of claim 30 wherein said document circulation path is common for both said duplex and simplex document sets for one said inversion in said copying circulation.

34. Duplicating apparatus for producing copies from a set of original sheets, the original sheets defining first and second faces, the copies including ccorresponding sets of individual supports having first and second faces, said apparatus comprising:

a feeder for the original sheets, said feeder including a feeder hooper for receiving the set of original sheets, means defining an exposure position spaced from said hopper at which the original sheets are located for copying, and means for circulating the set of original sheets a plurality of times from said hopper to said exposure position and back to said hopper, said circulating means including means for presenting the second faces of the original sheets for copying on the first and every odd copying circulation and for presenting the first faces of the original sheets for copying on the second and every even copying circulation;

a process section for establishing visible representations of the original faces presented in said exposure position; and a copy duplexing section having means for presenting and re-presenting the copy supports to said process section to receive the visible representations on the second and first faces of the copy supports, said presenting and re-presenting means including a support hopper for receiving a respective set of the copy supports between the presentation and re-presentation of the supports to said process section, means for delivering the supports to said support hopper with each support on top of previously delivered supports, and means for removing the supports from said support hopper with the first delivered support removed before later delivered supports.

35. Duplicating apparatus as set forth in claim 34 wherein said removing means of said copy duplexing section comprises a support feeder positioned under the support hopper for withdrawing supports one-after-another from the bottom of a set of supports in the support hopper and for directing such removed supports seriatim to the process section to receive respective second visible representations thereon.

36. Duplicating apparatus as set forth in claim 35 further comprising a copy receiving hopper, means defining a first support path leading from said process section to said support hopper and a second support path leading from said process section to said copy receiving hopper, and means for selectively directing said copy supports along one of said paths leading to said support hopper or said receiving hopper.

37. A document feeder for presenting seriatim to a copying apparatus a set of a plurality of document sheets, each document sheet having opposed first and second faces, said feeder comprising:
 a support having a single sheet supporting floor for receiving the set of document sheets in a stack thereon;
 means defining an exposure position which is spaced from said floor and at which the document sheets are presented for copying; and
 means for circulating the set a plurality of times, one sheet after another, through a circulation path from said support to said exposure position for copying one face and back to said support, said circulating means defining a first sheet path extending from said floor to said exposure position and a second sheet path extending from said exposure position back to said support and said circulating means including means for removing sheets seriatim from the bottom of the stack on said support and for circulating each of the sheets succesively along said first sheet path and through said exposure position and then through said second sheet path and for returning the sheets to the top of the stack after presenting only one face of each sheet at said exposure position for copying only once per circulation, and with a total odd number of document sheet inversions for the entire circulation path;
 so that only first faces of the sheets are presented for copying on odd numbered set circulations and only second faces are presented for copying on even numbered set circulations, and said sheets are returned to said stack during each circulation inverted from their preceding orientation in said stack.

38. The document feeder of claim 37, wherein said circulating means circulates the document sheets in a continuous unidirectional circulation path without reversal through said exposure position.

39. The document feeder of claim 37, wherein said circulation means additionally selectably provides an alternative circulation path for simplex document sheet handling, differing from the first-mentioned circulation path by only one document sheet inversion, and with an even total number of document inversions, so that selectably the same faces of the document sheets may be copied on both odd and even numbered set circulations.

* * * * *